United States Patent Office 3,046,267
Patented July 24, 1962

3,046,267
CATALYTIC PROCESS FOR POLYMERIZING ETHYLENICALLY UNSATURATED HYDROCARBONS
Howard J. Cohen and John M. Hoyt, Cincinnati, Ohio, assignors to National Distillers and Chemical Corporation, New York, N.Y., a corporation of Virginia
No Drawing. Filed Sept. 22, 1959, Ser. No. 841,447
9 Claims. (Cl. 260—94.9)

The present invention relates to an improved polymerization process and, particularly, to such a process utilizing a catalyst system that is novel for polymerizing olefins to high molecular weight polymers. Still more particularly, the invention relates to such a process utilizing a catalyst system that exhibits a high degree of catalytic activity, is advantageously substantially soluble in conventional reaction media employed for polymerizing olefins, and is highly stable against objectionable hydrolysis and thermal decomposition.

In the process embodied herein, the catalyst system comprises (1) a suitable reducing agent and (2) a compound of the formula $$M^nO(OSiR_3)_y$$

wherein M is the metal $Ti^{+3}$ to $^{+4}$, $Zr^{+3}$ to $^{+4}$, $Hf^{+3}$ to $^{+4}$, $V^{+3}$ to $^{+5}$, $Nb^{+3}$ to $^{+5}$, and $Ta^{+3}$ to $^{+5}$, $n$ is the valence of the metal M, $y=n-2$, and R is a hydrocarbon radical, e.g., alkyl, aralkyl, alkenyl, aryl, cycloalkyl, etc. Preferably, R is an alkyl radical, such as one containing from one to 8 carbon atoms, and specifically, methyl, ethyl, propyl, isopropyl, n-butyl, sec-butyl, isobutyl, t-butyl, n-amyl, isoamyl, n-hexyl, n-heptyl, n-octyl, 2-ethylhexyl, etc. However, R may have a significance other than alkyl as aforesaid and, for example, may be phenyl, p-tolyl, etc. As specific examples of compounds falling within the scope of the aforesaid structural formula and useful for the practice of this invention are the following: bis(trimethylsiloxy)titanium monoxide, bis(trimethylsiloxy)zirconium monoxide, and tris(trimethylsiloxy)-vanadium monoxide, etc. Compounds of such type may be prepared by the method disclosed in copending application, Serial No. 832,497, filed August 10, 1959, entitled "Triorganosiloxymetal Oxides."

In reference to the reducing agent that is one component of the catalyst system embodied herein, particularly suitable and preferred are the alkylaluminum halides, such as dialkylaluminum halides, alkylaluminum dihalides, and mixtures thereof generally called "sesquihalides." Thus, embodied for use herein are ethylaluminum sesquibromide, ethylaluminum sesquichloride, methylaluminum dibromide, dimethylaluminum bromide, methylaluminum dichloride, dimethylaluminum chloride, butylaluminum dibromide, dibutylaluminum chloride, hexylaluminum dibromide, dihexylaluminum bromide, and similar alkylaluminum halides and mixtures thereof. Still other reducing agents embodied for use herein are strong reducing agents such as alkali metals (e.g., sodium), alkaline earth metals (e.g., magnesium, calcium), organoalkali compounds (e.g., alkylsodium), organometallic compounds (e.g., trialkylaluminum), and the like, with further specific examples including tripropylaluminum, triisobutylaluminum, tri-n-decylaluminum, butylmagnesium chloride, dibutylmagnesium, metal hydrides such as lithium hydride, magnesium hydride, etc.

Reaction conditions at which the polymerization may be carried out with the novel catalyst system include the following:

Temperature _____ From $-120°$ to $300°$ C., preferably 50 to 250° C.
Pressure _____ Subatmospheric to 3000 atmospheres, preferably atmospheric pressure to 200 atmospheres.
Ratio of catalyst components (mole ratio of reducing agent:silicon-containing compound) _____ 0.1 to 50:1, preferably 1 to 20:1.
Total catalyst concentration (based on weight of monomer to be polymerized) ____ 0.005 to 10%.

Although the invention, in broad aspects, can be carried out under the aforesaid conditions, particularly suitable results are obtained by use of an aluminum-containing reducing agent, preferably an alkylaluminium halide, in combination with the aforesaid compound $$M^nO(OSiR_3)_y$$

Furthermore, and in specific reference thereto, the components are used in such proportional amounts that the atomic ratio of Al/M$^n$ does not exceed 10:1 and preferably, in a ratio of 2 to 10:1 and, still more preferably, 4 to 8:1 as use of a ratio of more than 10:1 tends to decrease catalyst efficiency with lowering of yield of the desired polymer.

The compounds which may be polymerized according to the present invention consist generally of hydrocarbons, such as the olefins containing from 2 to 16 carbon atoms that are polymerizable when contacted with the aforedefined combination catalyst under polymerizing conditions of temperature and pressure. Specific examples of such polymerizable hydrocarbons include ethylene, propylene, butene-1, pentene-1, hexene-1, 4-methyl-pentene-1, butadiene, isoprene, styrene and methyl styrene, and the like. Mixtures of such polymerizable hydrocarbons as for example a mixture of ethylene and butene-1, may also be used for copolymerization with the catalyst system embodied herein.

The polymerization reaction is carried out either in batch, semi-continuous, or continuous operations. Most conveniently, and in the present embodiments, the process at lower pressure operations is carried out in a diluent or liquid reaction medium, the amount not being unduly critical, but it should be at least sufficient to permit effective agitation and preferably to hold the major portion of the polymer in solution.

Suitable organic media include aliphatic alkanes or cycloalkanes such as pentane, hexane, heptane, cyclohexane; hydrogenated aromatics such as tetrahydronaphthalene, high molecular weight liquid paraffins which are liquid at the reaction temperature; aromatics such as benzene, toluene, xylene; halogenated aromatics such as chlorobenzene, chloronaphthalene, etc. Other reaction media include ethylbenzene, isopropyl benzene, ethyl toluene, n-propyl benzene, diethylbenzenes, mono- and di-alkyl naphthalenes, n-octane, isooctane, methyl cyclohexane, tetralin, decalin and other inert liquid hydrocarbons. In carrying out the polymerization reaction at relatively high pressures, such as at about one thousand atmospheres and above, it may be carried out in the absence or substantial absence of such reaction media and, in such instances, the need for solvent recovery systems, etc. may be obviated.

It is preferred that the reaction medium that is used be essentially free of impurities which may react to destroy catalyst activity or which copolymerize with the olefinic hydrocarbon; that is, appreciable quantities of materials such as carbon dioxide, oxygen, and acetylenic compounds should preferably be absent.

For this process the polymerizable hydrocarbon may be used in substantially pure form or there may be used a mixture containing major quantities thereof, provided no impurities are present in substantial amounts to destroy the catalyst and/or contaminate the polymer products. For instance, ethylene obtained by the cracking of hydrocarbon streams is satisfactory if acetylenic and oxygenated materials are not present in more than trace amounts.

In carrying out the herein described polymerization process, it is preferable and highly desirable to maintain the polymerization zone free of extraneous gases. This can be done by keeping the reactor blanketed at all times with an inert gas, for example, operating with an inert gas such as nitrogen, argon, or helium. Preferably the reactor and its contents are blanketed with the polymerization substance, e.g., ethylene gas, to avoid unnecessary dilution of the reactor contents with inert gases.

In order to further describe the invention, the following examples set forth specific embodiments of catalyst systems embodied herein for polymerizing ethylene to high molecular weight polymers. For the examples set forth, the reducing agent component of the catalyst system was ethylaluminum sesquichloride (a 1:1 mixture of $$Al(C_2H_5)Cl_2$$

and $Al(C_2H_5)_2Cl$) and the other component was tris(trimethylsiloxy)-vanadium monoxide: $VO[OSi(CH_3)_3]_3$.

In each of the examples, the polymerization was carried out in a 250 ml. three-necked glass reaction flask equipped with a high-speed stirrer, thermometer, mercury manometer for reading reactor pressure, and feed lines supplying purified ethylene and purified decahydronaphthalene. The ethylene was supplied through a pressure reducing valve on a demand basis during the polymerization to maintain a constant ethylene pressure in the reactor (60 mm. Hg gauge). The amount of ethylene absorbed was determined from the pressure drop observed at constant temperature in a supply tank of known volume.

With 160 ml. of purified decahydronaphthalene (heated to 125° C.) in the reactor, a 0.1 M solution (in purified decahydronaphthalene) of the ethylaluminum sesquichloride was added in the amount sufficient to provide the concentration shown for each example in the following tabulation and, after an elapse of 1½ minute, a 0.09 M solution (in purified decahydronaphthalene) of the $VO[OSi(CH_3)_3]_3$ was added to provide the amount thereof also shown for each example. After such addition of catalyst components, the polymerization was conducted at a purified ethylene pressure of 60 mm. Hg gauge and at 125° C. for 20 minutes, whereupon the viscous solution of the polymeric product was withdrawn from the reactor and diluted with an equal volume of acetone. The solid polymer was collected by filtration, boiled 10 minutes in each of three successive portions of a solution of 1 part by volume of concentrated hydrochloric acid solution and 2 parts by volume of isopropyl alcohol, then boiled 10 minutes in each of three portions of isopropyl alcohol, washed with acetone, and dried in a vacuum oven at 120° C. to constant weight.

Results of several such experiments are shown in the table.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A polymerization process which comprises contacting a lower molecular weight ethylenically unsaturated hydrocarbon with a combination catalyst comprising (1) a reducing agent from the group consisting of alkyl aluminum halides and trialkyl aluminum and (2) a compound of the formula $$M^nO(OSiR_3)_y$$

wherein M is a member from the group consisting of vanadium, titanium and zirconium, $n$ is the valence of M, $y = n-2$, and R is a hydrocarbon radical to produce a normally solid polymer of said unsaturated hydrocarbon.

2. A process, as defined in claim 1, wherein R is an alkyl radical of one to eight carbon atoms.

3. A process, as defined in claim 1, wherein M is vanadium.

4. A process, as defined in claim 1, wherein the reducing agent is an ethylaluminum sesquichloride.

5. A process, as defined in claim 1, wherein R is methyl.

6. A polymerization process which comprises contacting a lower molecular weight monoolefinic hydrocarbon at from $-120°$ to $300°$ C. with from about 0.005 to about 10%, based on the weight of the monoolefinic hydrocarbon, of a combination catalyst comprising (1) a reducing agent from the group consisting of alkylaluminum halides and trialkylaluminum and (2) a compound of the formula $$M^nO(OSiR_3)_y$$

wherein M is a member from the group consisting of vanadium, titanium and zirconium, $n$ is the valence of M, $y = n-2$, and R is a hydrocarbon radical in which the mole ratio of the reducing agent to said compound is 0.1 to 50:1 to produce a normally solid polymer of said monoolefinic hydrocarbon.

7. A process, as defined in claim 6, wherein the reducing agent is ethylaluminum sesquichloride and the compound is tris(trimethylsiloxy)vanadium monoxide, and the monoolefinic hydrocarbon is ethylene.

8. A process, as defined in claim 6, wherein the polymerization reaction is carried out in presence of an inert liquid reaction medium.

9. A process, as defined in claim 6, wherein M is vanadium, and the reducing agent and the compound in which M is vanadium are present in the combination catalyst in amounts such that the Al/V atomic ratio is 2 to 10:1.

*Table*

| Run No. | $(C_2H_5)_3Al_2Cl_3$, millimoles | $VO[OSi(CH_3)_3]_3$, millimoles | Al/V Atomic Ratio | $C_2H_4$ Absorption after 20 min., gram-moles per gram mole total catalyst | Properties of isolated polymer [1] | | |
|---|---|---|---|---|---|---|---|
| | | | | | relative viscosity [2] | density, grams cc. [3] | softening point, °C. [4] |
| 1 | 0.070 | 0.017 | 8.0 | 650 | 2.564 | 0.9458 | 202 |
| 2 | 0.070 | 0.017 | 8.0 | 605 | | | |
| 3 | 0.061 | 0.017 | 7.0 | 630 | 2.387 | 0.9422 | 205 |
| 4 | 0.061 | 0.017 | 7.0 | 645 | | | |

[1] Properties determined on combined polymer for listed runs.
[2] Relative viscosity of a 0.1 weight percent solution in decahydronaphthalene at 130° C.
[3] Determined by ASTM method D-1238.
[4] Softening point under compression at 66 p.s.i.

References Cited in the file of this patent

UNITED STATES PATENTS

| 2,863,891 | Granchelli et al. | Dec. 9, 1958 |
| 2,938,000 | Wanless | May 24, 1960 |

FOREIGN PATENTS

| 534,792 | Belgium | Jan. 31, 1955 |